(12) United States Patent
Aida

(10) Patent No.: US 6,670,764 B2
(45) Date of Patent: Dec. 30, 2003

(54) DISCHARGE LAMP UNIT WITH NOISE SHIELDS AND NOISE CONTROL METHOD FOR DISCHARGE LAMP UNIT

(75) Inventor: Kenji Aida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/073,892

(22) Filed: Feb. 14, 2002

(65) Prior Publication Data

US 2002/0117970 A1 Aug. 29, 2002

(30) Foreign Application Priority Data

Feb. 28, 2001 (JP) ........................................ 2001-053648

(51) Int. Cl.[7] ............................ H01J 13/46; H01J 29/88
(52) U.S. Cl. ............................................. 315/56; 313/479
(58) Field of Search ................................. 315/56, 61, 63; 313/146, 239, 240, 242, 479, 477

(56) References Cited

U.S. PATENT DOCUMENTS 4,864,194 A * 9/1989 Kobayashi et al. ......... 315/248
5,188,444 A * 2/1993 Makita et al. .............. 362/519
5,343,370 A * 8/1994 Ohashi et al. .............. 362/459
5,838,109 A * 11/1998 Kobayashi et al. ........... 315/58

FOREIGN PATENT DOCUMENTS

| JP | A-6-5375 | 1/1994 |
| JP | A-9-251895 | 9/1997 |

* cited by examiner

Primary Examiner—Don Wong
Assistant Examiner—Minh D A
(74) Attorney, Agent, or Firm—Posz & Bethards, PLC

(57) ABSTRACT

A discharge lamp unit with noise shields includes a discharge lamp, a discharge lamp control circuit, a filter circuit, the first and the second shield cases, and a power supply. The first shield case shields a discharge lamp control circuit and a filter circuit. The second shield case exclusively shields the filter circuit. Further, a ground wire of the filter circuit and the first shield case are electrically connected. Still further, a ground wire of the control circuit and the second shield case are electrically connected.

12 Claims, 5 Drawing Sheets

DISCHARGE LAMP UNIT WITH NOISE SHIELDS AND NOISE CONTROL METHOD FOR DISCHARGE LAMP UNIT

CROSS REFERENCE TO RELATED APPLICATION

This application is based on and incorporates herein by reference Japanese Patent Application No. 2001-53648 filed on Feb. 28, 2001.

BACKGROUND OF THE INVENTION

The present invention relates to a discharge lamp unit with noise shields and a noise control method for a discharge lamp unit.

One proposed arrangement for noise control in a discharge lamp unit is shown in FIG. 7. A discharge lamp 200 includes a discharge lamp body 201 and a connector 202. The connector 202 is electrically connected with a discharge lamp control circuit 210 which regulates a voltage applied to the discharge lamp 200. A filter circuit 211 is connected between the control circuit 210 and a power supply 230 to reduce noise radiation and conduction from the discharge lamp 200 or the control circuit 210 to the power supply 230.

In this arrangement, noise produced during an operation of driving the discharge lamp 200 with a rectangular wave is conducted to the control circuit 210. When a DC/DC converter in the control circuit 210 is switched to step up a voltage to the level required for a start or steady lighting of the discharge lamp 200, switching noise is produced. In the case of the discharge lamp 200 being used for a headlight of a vehicle, noise in power supply lines may result in radio noise. To avoid this, a filter circuit 211 is connected between the control circuit 210 and the power supply 230. Moreover, the control circuit 210 is shielded with a shield case 220 to reduce noise radiation therefrom.

Although the noise from the control circuit 210 can be reduced by the shield case 220, it may still be radiated outside the shield case 220 via wires 240. To counter this problem, another arrangement, as shown in FIG. 8, is proposed. In this proposed arrangement, the control circuit 210, the filter circuit 211, and the wires 240 are shielded by a shield case 221. However, this does not provide sufficient shielding since the noise may be conducted to the power supply 230 or radiated via wires 241.

SUMMARY OF THE INVENTION

The present invention therefore has an objective to provide a discharge lamp unit with noise shields which enable superior control of noise radiation and noise conduction from a discharge lamp or a discharge lamp control circuit to a filter circuit and a power supply.

Another objective of the present invention is to provide a superior noise control method for a discharge lamp control unit.

According to the present invention, the second shield case is installed to exclusively shield the control circuit in addition to the first shield case shielding the discharge lamp control circuit and the filter circuit. One of the wires connecting the filter circuit to the power supply, referred to as a ground wire and the first shield case are electrically connected near the shield case opening through which the ground wire passes. As a result, noise is reduced even if noise produced by the discharge lamp or the control circuit is conducted outside the first shield case via the wires.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

[First Embodiment]

Figure 1:
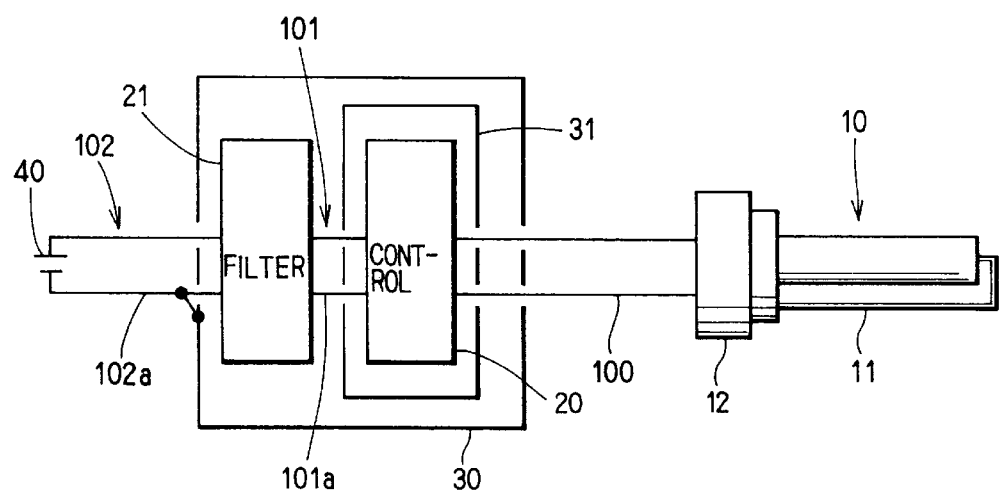
FIG. 1 is a schematic diagram showing a discharge lamp unit with noise shields according to the first embodiment of the present invention.

Referring to FIG. 1, a discharge lamp unit with noise shields includes a discharge lamp 10, a discharge lamp control circuit 20, a filter circuit 21, and a power supply 40. The discharge lamp includes a discharge lamp body 11, and a connector 12 which electrically connects the discharge lamp body 11 and wires 100. The control circuit 20 regulates a voltage supplied to the discharge lamp 10. The filter circuit 21 reduces noise conduction from the control circuit 20 to the power supply 40 via wires 101.

The discharge lamp unit also includes first and second shield cases 30 and 31. The first shield case 30, made of an aluminum, shields the control circuit 20, the filter circuit 21, and the second shield case 31. The second shield case 31, made of an aluminum, exclusively shields the control circuit 20. The first shield case 30 covers the second shield case 31. The second shield case 31 isolates the control circuit 20 from the filter circuit 21 and performs as a partition member.

Wires 102 electrically connect the filter circuit 21 to the power supply 40. One of the wires 102, the ground wire 102a in specific, and the first shield case 30 are electrically connected near the shield case opening through which the ground wire 102a passes. The electrical connection between the shield case 30 and the ground wire 102a can be made in various ways. Connecting a core wire of the ground wire 102a with the shield case 30 is one of the ways. Providing a ground terminal for the shield case 30, and connecting the ground wire 102a to the ground terminal is another way.

The control circuit 20 supplies a voltage to the discharge lamp 10. The voltage is stepped up by a DC/DC converter in the control circuit 20 to the level required for a start or steady lighting of the discharge lamp 10. Steady lighting of the discharge lamp 10 is maintained by continuously applying a rectangular wave of voltage.

To step up the voltage by the DC/DC converter, switching is required. Therefore, switching noise is produced in the control circuit 20 during the operation. When driving the discharge lamp 10 by a rectangular wave, noise is produced. The noise is conducted to the discharge lamp control circuit 20 via the wires 100. The noise may be further conducted to the power supply 40 via the wires 101 and 102. To reduce this noise conduction, the filter circuit 21 is connected between the discharge lamp control circuit 20 and the power supply 40.

Moreover, the shield case 31 which shields the control circuit 20 reduces noise radiation from the control circuit 20. However, this does not provide sufficient shielding since the noise may still be radiated outside the shield case 31 via the wires 101. Therefore, the shield case 30 is installed to shield the control circuit 20, the filter circuit 21, the shield case 31, and the wires 101.

Noise radiated from the wires 101 may still be conducted to the power supply 40 or radiated via the wires 102. Therefore, the ground wire 102a and the shield case 30 are electrically connected near the shield case opening through which the ground wire 102a passes.

Figure 2A:
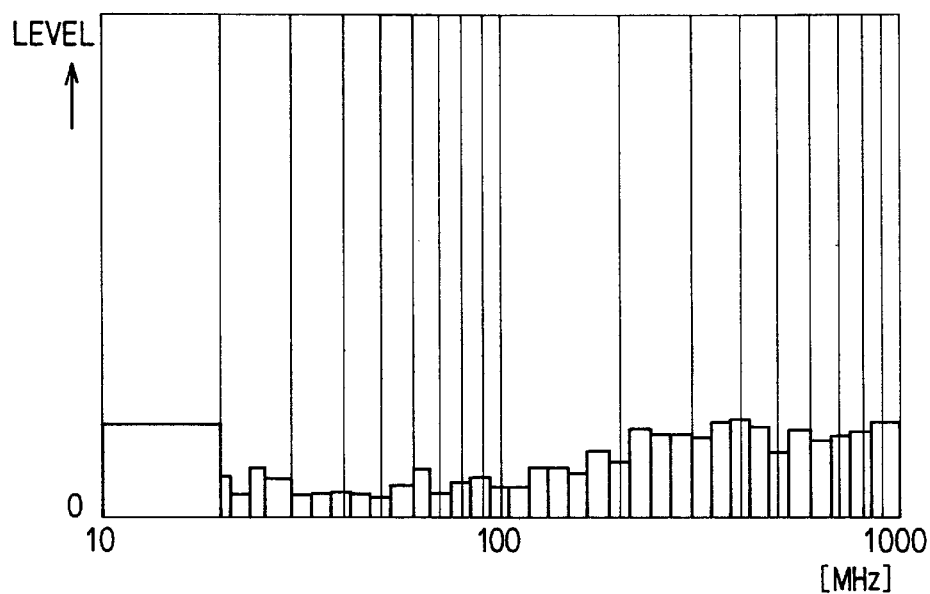
FIG. 2A is a characteristic diagram showing noise levels versus frequencies up to 1000 MHz according to the first embodiment.
Figure 2B:
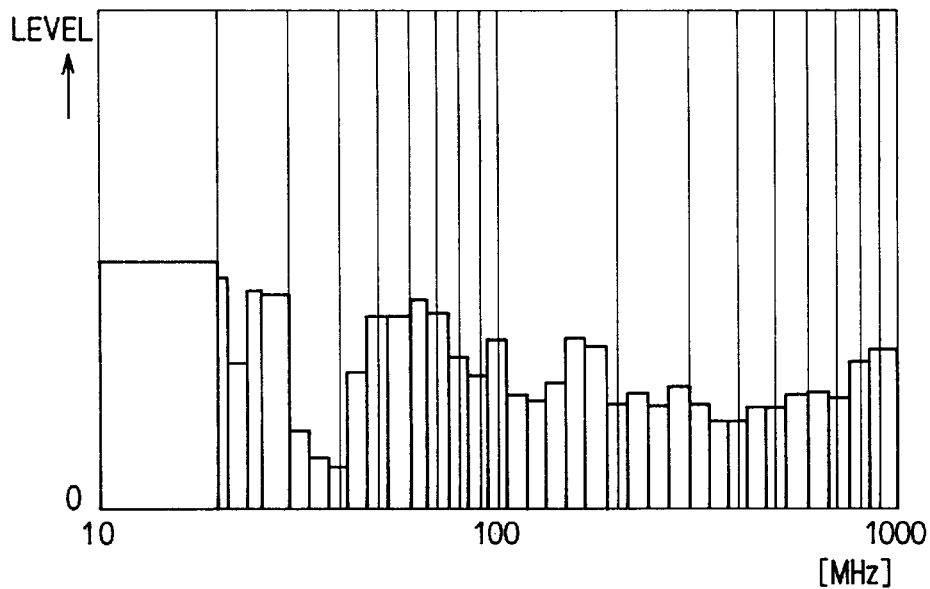
FIG. 2B is a characteristic diagram showing noise levels versus frequencies up to 1000 MHz according to the first proposed method of the related art.
Figure 3A:
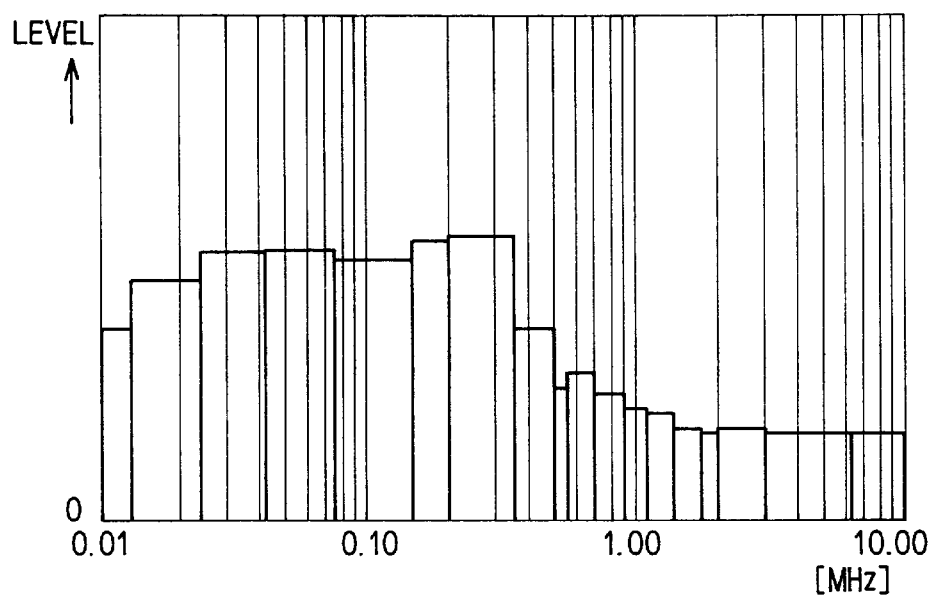
FIG. 3A is a characteristic diagram showing noise levels versus frequencies up to 10 MHz according to the first embodiment.
Figure 3B:
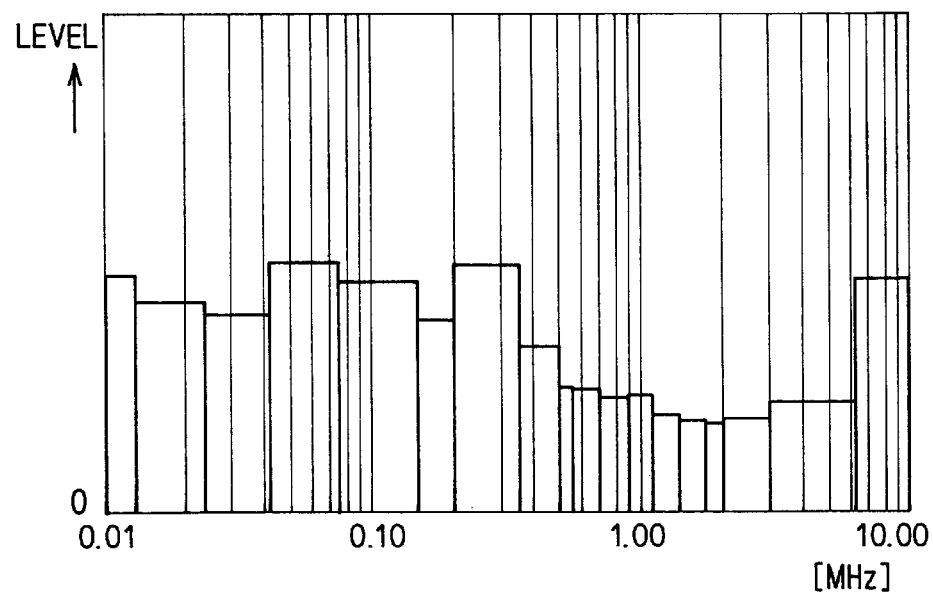
FIG. 3B is a characteristic diagram showing noise levels versus frequencies up to 10 MHz according to the first proposed method of the related art.

Referring to FIGS. 2 and 3, noise levels in this embodiment and in the first related art have no remarkable differences in the 0.01 MHz to 1 MHz range. However, the noise level in this embodiment is much lower than that of the first related art in the over 1 MHz range.

[Second Embodiment]

Figure 4:
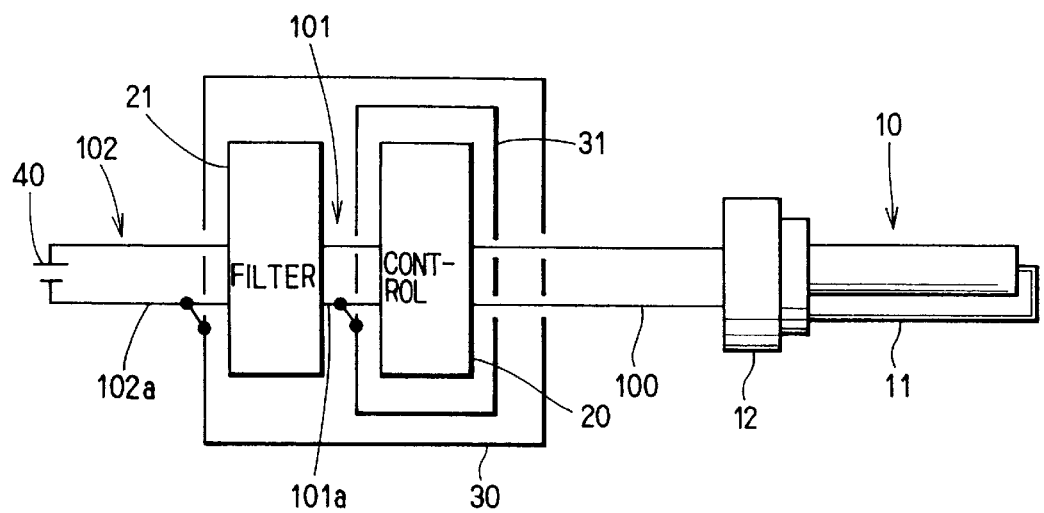
FIG. 4 is a schematic diagram showing the discharge lamp unit according to the second embodiment of the present invention.

Referring to FIG. 4, one of the wires 101, a ground wire 101a in specific, and the shield case 31 in the first embodiment are electrically connected near the shield case opening through which the ground wire 101a passes. This reduces noise conduction from the control circuit 20 to the filter circuit 21 via the wires 101.

[Third Embodiment]

Figure 5:
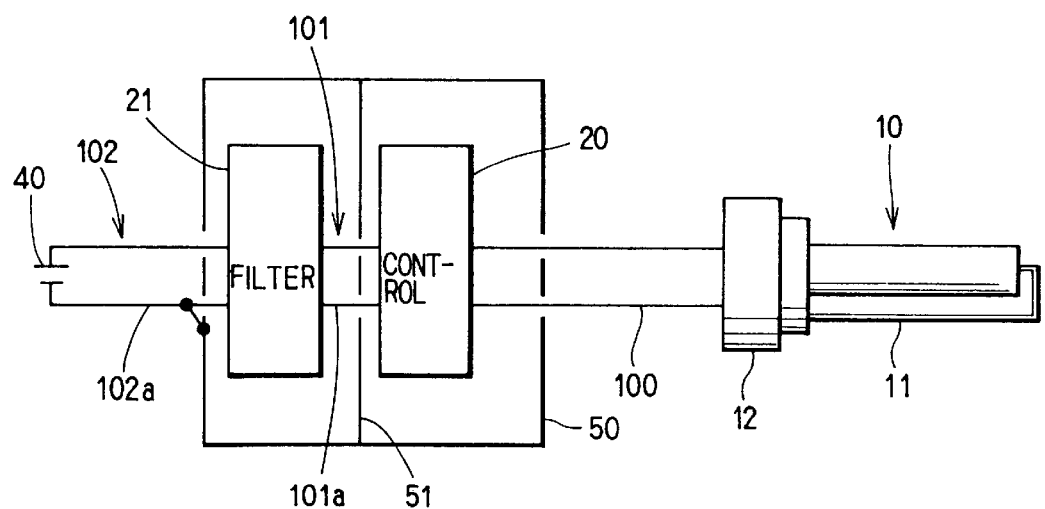
FIG. 5 is a schematic diagram showing the discharge lamp unit according to the third embodiment of the present invention.
Figure 7:
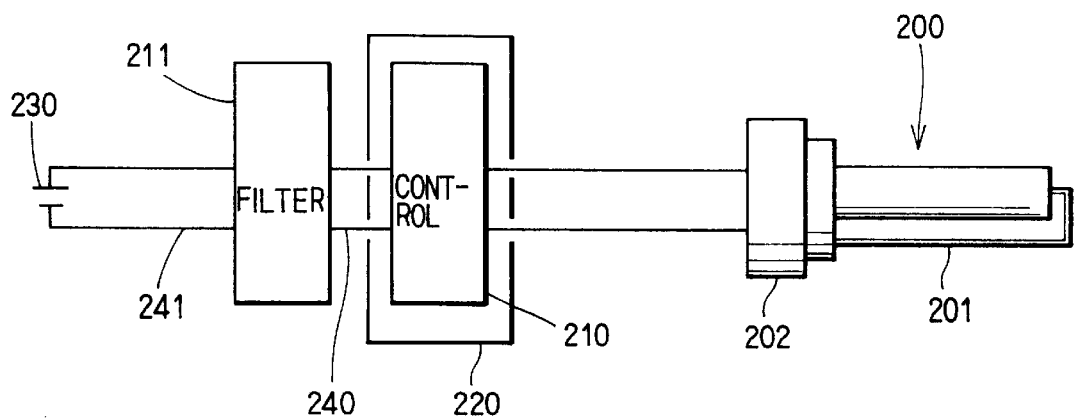
FIG. 7 is a schematic diagram showing a discharge lamp unit according to the first related art.
Figure 8:
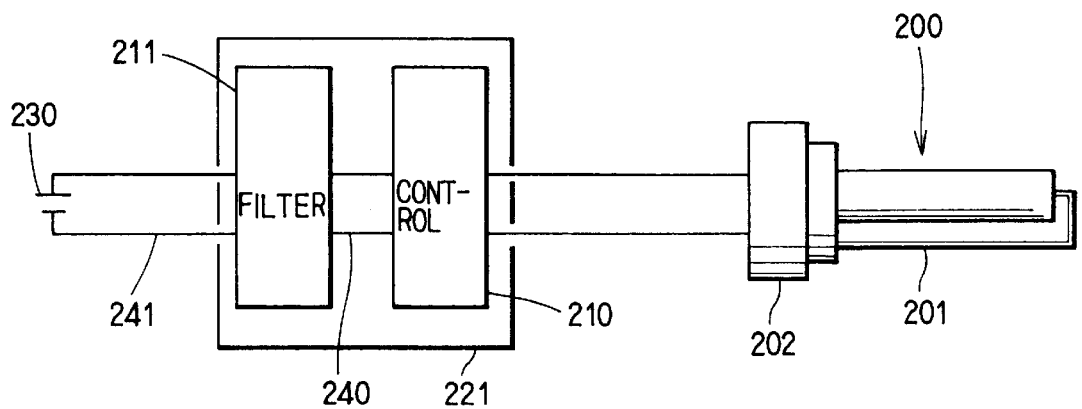
FIG. 8 is a schematic diagram showing a discharge lamp unit according to the second related art.

Referring to FIG. 5, the control circuit 20 and the filter circuit 21 in the first embodiment are shielded by an aluminum shield case 50, which is referred to as the first shield case. The shield case 50 includes an aluminum partition plate 51, which divides interior space of the shield case 50 into two portions. One of the portions contains the control circuit 20, and the other contains the filter circuit 21. The control circuit 20 side portion of the shield case 50 and the partition plate 51 form the second shield case. The ground wire 102a and the shield case 50 are electrically connected near the shield case opening through which the ground wire 102a passes.

Shielding the control circuit 20 with the second shield case 50 and 51 reduces the noise radiation from the control circuit 20. Shielding the control circuit 20, the filter circuit 21, the shield case 31, and the wires 101 with the shield case 50 reduces noise radiation from the wires 101. Electrically connecting the ground wire 102a and the shield case 50 reduces noise conduction through the wires 102. Therefore, noise conduction from the discharge lamp 10 or the control circuit 20 to the power supply 40 is reduced.

[Fourth Embodiment]

Figure 6:
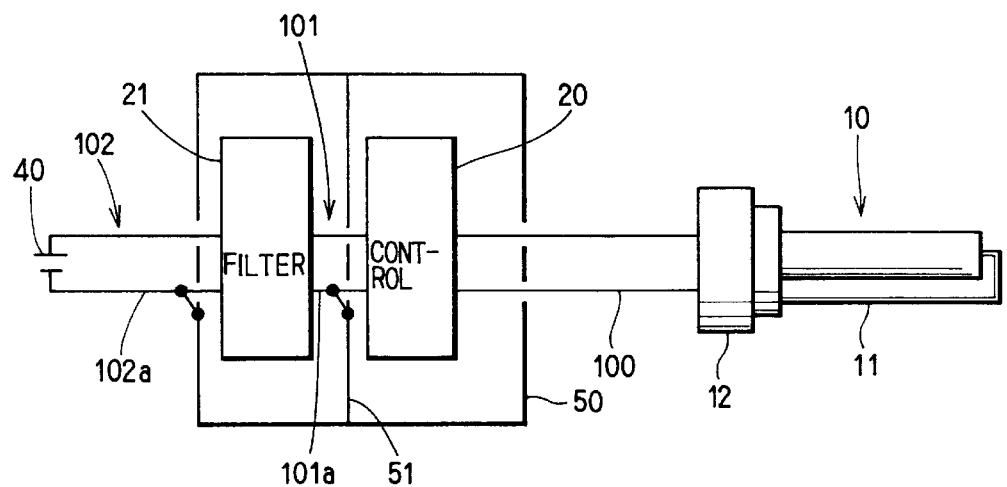
FIG. 6 is a schematic diagram showing the discharge lamp unit according to the fourth embodiment of the present invention.

Referring to FIG. 6, the ground wire 101a and the partition plate 51 in the third embodiment are electrically connected. This reduces noise conduction from the control circuit 20 to the filter circuit 21 via the wires 101.

In the above embodiments, the ground wire 102a and the first shield case 30 or 50 are electrically connected near the shield case opening through which the ground wire 102a passes. As a result, noise conduction from the discharge lamp 10 or the control circuit 20 to the power supply 40 is reduced.

The present invention should not be limited to the embodiment previously discussed and shown in the drawings, but may be implemented in various ways without departing from the spirit of the invention. For example, the ground wire 101a or 102a and the shield cases 30, 50, or 51 are connected inside the shield cases 30, 50, or 51 instead of outside the shield cases 30, 50, or 51 as shown in the drawings.

What is claimed is:

1. A discharge lamp unit with noise shields comprising:
    a discharge lamp control circuit for regulating a voltage supplied to a discharge lamp;
    a filter circuit that is electrically connected to the power supply for reducing noise produced by the discharge lamp or the discharge lamp control circuit;
    a first shield case for shielding the discharge lamp control circuit and the filter circuit;
    a second shield case for exclusively shielding the discharge lamp control circuit; and
    a ground wire, that electrically connects the filter circuit and the power supply, and that is electrically connected with the first shield case near a shield case opening through which the ground wire passes.

2. A discharge lamp unit with noise shields as in claim 1, further comprising a ground wire, which electrically connects the discharge lamp control circuit and the filter circuit, for electrically connecting with the second shield case near a shield case opening through which the ground wire passes.

3. A discharge lamp unit with noise shields as in claim 1, wherein the first shield case covers the second shield case.

4. A discharge lamp unit with noise shields as in claim 1, wherein a part of the first shield case forms a part of the second shield case.

5. A discharge lamp unit with noise shields as in claim 1, wherein the filter circuit is electrically connected between the power supply and the discharge lamp control circuit.

6. A discharge lamp unit with noise shields as in claim 1, wherein the ground wire is electrically connected to the inside of the first shield case near the shield case opening through which the ground wire passes.

7. A discharge lamp unit with noise shields as in claim 1, wherein the ground wire is electrically connected to the outside of the first shield case near the shield case opening through which the ground wire passes.

8. A noise control method for a discharge lamp unit comprising:
    shielding a discharge lamp control circuit;
    further shielding the discharge lamp control circuit along with a filter circuit; and
    reducing noise radiation and noise conduction via wires which electrically connect the filter circuit to a power supply.

9. A noise control method for a discharge lamp unit as in claim 8, further comprising reducing noise radiation and noise conduction via wires which electrically connect the discharge lamp control circuit to the filter circuit.

10. A discharge lamp unit with noise shields comprising:
    a discharge lamp control circuit for regulating a voltage supplied to a discharge lamp;

a filter circuit that is electrically connected to the power supply for reducing noise produced by the discharge lamp or the discharge lamp control circuit;

a shield case for shielding the discharge lamp control circuit and the filter circuit;

a partition plate for dividing an interior space of the shield case into first and second portions; and a ground wire that electrically connects the filter circuit and the power supply and that electrically connects to the shield case near a shield case opening through which the ground wire passes, wherein the discharge lamp control circuit is arranged in the first portion, and the filter circuit is arranged in the second portion.

11. A discharge lamp unit with noise shields as in claim 10, further comprising a second ground wire for electrically connecting the filter circuit, the discharge lamp and the partition plate.

12. A discharge lamp unit with noise shields as in claim 10, wherein the shield case is an aluminum shield case and the partition plate is an aluminum partition plate.

* * * * *